United States Patent
Izzard

(10) Patent No.: US 6,493,981 B2
(45) Date of Patent: Dec. 17, 2002

(54) SLIP BOBBER WITH HOOK SETTING DEVICE

(76) Inventor: David Carl Izzard, 877 E. 5 Mile Rd. S.S.M. Mi., Sault Ste. Marie, MI (US) 49783

( * ) Notice: Subject to any disclaimer, the term of this patent is extended or adjusted under 35 U.S.C. 154(b) by 0 days.

(21) Appl. No.: 09/813,080

(22) Filed: Mar. 20, 2001

(65) Prior Publication Data

US 2002/0166282 A1 Nov. 14, 2002

(51) Int. Cl.$^7$ ................. A01K 93/00; A01K 91/06
(52) U.S. Cl. ..................... 43/15; 43/16; 43/44.9
(58) Field of Search .................. 43/15, 16, 44.87, 43/44.88, 44.9, 44.91

(56) References Cited

U.S. PATENT DOCUMENTS

| | | | |
|---|---|---|---|
| 751,734 A | * 2/1904 | Hymers | 43/15 |
| 1,012,899 A | * 12/1911 | Nelson | 43/15 |
| 1,292,860 A | * 1/1919 | Obermiller | 43/15 |
| 1,816,235 A | * 7/1931 | Schroeder | 43/15 |
| 1,866,864 A | * 7/1932 | Schroeder | 43/15 |
| 1,989,407 A | * 1/1935 | Ezell | 43/15 |
| 2,144,175 A | * 1/1939 | Zonn | 43/15 |
| 2,147,917 A | * 2/1939 | Noren | 43/15 |
| 2,374,752 A | * 5/1945 | Johnson | 43/15 |
| 2,530,007 A | * 11/1950 | Euzent | 43/15 |
| 2,534,795 A | * 12/1950 | Ramsey | 43/15 |
| 2,557,030 A | * 6/1951 | Inglis | 43/15 |
| 2,694,875 A | * 11/1954 | Hoffmann | 43/15 |
| 2,706,866 A | * 4/1955 | Lucchetti | 43/15 |
| 2,726,470 A | * 12/1955 | Bass et al. | 43/15 |
| 2,755,589 A | * 7/1956 | Osborne | 43/15 |
| 2,799,109 A | * 7/1957 | Remington | 43/15 |
| 2,808,673 A | * 10/1957 | Coughlin | 43/15 |
| 2,818,671 A | * 1/1958 | Crouch | 43/15 |
| 2,876,578 A | * 3/1959 | Argenio | 43/15 |
| 3,162,969 A | * 12/1964 | Knott | 43/15 |
| 3,766,680 A | * 10/1973 | Torme et al. | 43/16 |
| 3,973,346 A | * 8/1976 | Mason | 43/15 |
| 3,974,588 A | * 8/1976 | Blom et al. | 43/15 |

(List continued on next page.)

FOREIGN PATENT DOCUMENTS

| | | | | |
|---|---|---|---|---|
| CH | 257054 B1 | * | 3/1949 | 43/15 |
| CH | 280761 B1 | * | 5/1952 | 43/15 |
| FR | 924547 B1 | * | 8/1947 | 43/15 |
| IT | 517832 B1 | * | 3/1955 | 43/15 |
| IT | 579540 B1 | * | 7/1958 | 43/16 |

*Primary Examiner*—Darren W. Ark

(57) ABSTRACT

A Slip Bobber for fishing that has a internal hook setting device. This Slip Bobber with hook setting device consists of a float (13) which is manufactured of a buoyant material. A hook setting device is inserted in a vertical position Down through the center of the float (13). The hook setting device is comprised of, a sleeve (14) which contains a coil spring (15) and a slide (16). The slide (16) has a longitudinal passage down through the center of it which allows free passage of the fishing line (10). On the outside of the sleeve (14) there are two sets of mounting arms. Attached to the lower set of mounting arms is the slide lock lever (23) which holds the slide (16) and the coil spring (15) in their compressed position. Attached to the upper set of mounting arms is the release lever (18). On the outward end of the release lever (18) there is the release lever roller (21). The release lever roller (21) holds the slide lock lever (23) into it's locked position. On the inward end of the release lever (18) is the fishing line slot which allows the fishing line (10) to slide down through the device until the enlargement (10) comes to rest on the edges of the fishing line slot. Once the device set, any downward pressure on the fishing line (10) will rotate the release lever (18) and release the slide lock lever (23). Which in turn, releases the slide (16). The slide (16) will the move upward, creating a sudden jerk on the fishing line (10), setting the hook.

3 Claims, 7 Drawing Sheets

U.S. PATENT DOCUMENTS

| | | | |
|---|---|---|---|
| 4,021,957 A | * 5/1977 | Gleason | 43/16 |
| 4,139,960 A | 2/1979 | Chojnowski | 43/15 |
| 4,825,580 A | 5/1989 | Gray | 43/44.9 |
| 5,123,196 A | * 6/1992 | Pagano et al. | 43/44.88 |
| 5,327,672 A | 7/1994 | Johnson | 43/44.91 |
| 5,404,669 A | 4/1995 | Johnson | 43/44.91 |
| 5,438,788 A | * 8/1995 | Rich et al. | 43/15 |
| D571,421 | 7/1996 | Brackett | D22/146 |
| 5,542,205 A | * 8/1996 | Updike | 43/15 |
| 5,819,465 A | 10/1998 | Bryant | 43/16 |
| 5,937,565 A | 8/1999 | Maric et al. | 43/15 |
| 6,105,299 A | * 8/2000 | Rich | 43/15 |

\* cited by examiner

SLIP BOBBER WITH HOOK SETTING DEVICE

BACKGROUND—Field of Invention

This Invention relates to Fishing Floats, specifically to Slip Bobbers with a built in hook setting device.

BACKGROUND—Description of Prior Art

Currently there are many different configurations of fishing floats available to consumers. Floats come in all sizes, shapes and colors. Some floats have lights for night fishing. Most Fishing floats currently available are manufactured from materials such as cork, Styrofoam, polystyrene, plastic, metal and combinations of these materials. There has been several attempts at designing a fishing float with a reliable hook setting mechanism. There has also been many different designs of slip bobbers registered. I could not locate any attempts at combining these two features.

U.S. Pat. No. 5,937,565 makes a valid attempt at providing a hook setting mechanism. Unfortunately, their design appears to have a few shortcomings. For example, one of the problems with their design is the fact that the triggering mechanism is in the bottom of the float and due to the nature of it's intended use it would eventually come in contact with the bottom of a body of water and become soiled with mud, sand, algae, weeds or any number of other contaminants. Also the complex process involved in reactivating the hook setting mechanism seems to be a problem. I also question the repeatability of the sensitivity adjustment. Due to the fact that it consists of two parts rubbing against each other.

Another limitation of there design is that the length of the line that can be lowered under the float is limited to the length of line that the Fisherman can lift out of the water, with the float reeled up to the tip of their fishing pole. This is due to the fishing line being locked into a Driver element (25, 26). Which is attached at the top of the float.

SUMMARY

In accordance with the present invention a Slip Bobber with Hook Setting Device comprises, a mechanism capable of providing an automatic jerk on a fishing line, attached to a buoyant float which is capable of suspending the entire assembly on top of a body of water.

Objects and Advantages Several objects and advantages of the present invention are:

(a) To provide a Slip Bobber with hook setting device that can be used in any depth of water. This is due to the fact that the fishing line can slide through the entire assembly until a small enlargement placed on the fishing line comes to rest on top of the hook setting device.

(b) To provide a Slip Bobber with hook setting device that is very simple to operate.

(c) To provide a Slip Bobber with hook setting device that has a minimum number of moving parts.

(d) To provide a Slip Bobber with hook setting device that is sensitive enough to be activated by the lightest biting fish. This feature will reduce mortality of fish that are caught and released. This is because the Fish will likely be hooked before they have an opportunity to ingest the hook deep into their throats where they could receive life threatening injuries to their gills or digestive tract.

(e) To provide a Slip Bobber with hook setting device that has an adjustable sensitivity. This will allow the Fisherman to use different sizes of lures and allow the Fisherman to adjust sensitivity to compensate for possible wave action or casting of the float.

(f) To provide a Slip Bobber with hook setting device that has enough travel to give an effective hook set.

(g) To provide a Slip Bobber with hook setting device that will alert the fisherman when it is released.

(h) To provide a Slip Bobber with hook setting device that is easy to manufacture.

DRAWING FIGURES

REFERENCE NUMBERS IN DRAWINGS

Figure 8:
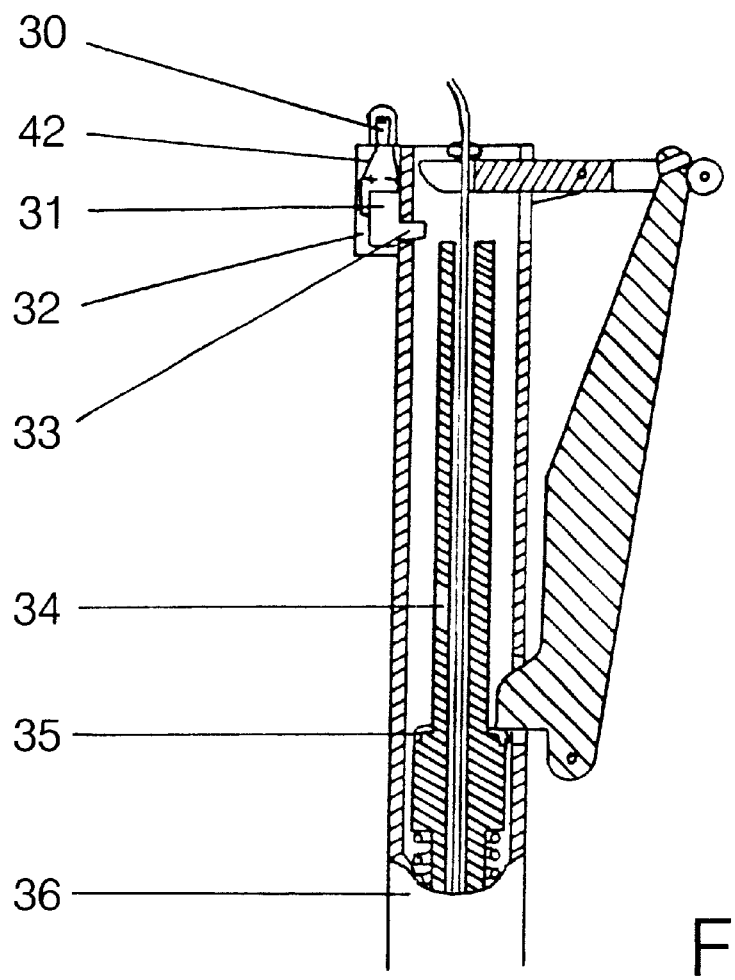
FIG. 8 is a front view of an alternative embodiment which is lighted.

10 Fishing Line
11 Enlargement placed on Fishing Line
12 Slide Stop
13 Float
14 Sleeve
15 Coil Spring
16 Slide
17 Rubber O-ring
18 Release Lever
19 Release Lever Pivot Pin
20 Sensitivity Adjustment Screw
21 Release Lever Roller
22 Release Lever Roller Pin
23 Slide Lock Lever
24 Slide Lock Lever Pin
25 Alternative Embodiment of Release Lever (FIG. 6, 7)
26 Alternative Embodiment of Slide Lock Lever Roller (FIG. 6, 7)
27 Alternative Embodiment of Sensitivity Adjustment Screw (FIG. 6, 7)
28 Alternative Embodiment of Slide Lock Lever (FIG. 6, 7)
29 Alternative Embodiment of Slide Lock Lever Roller Pin (FIG. 6, 7)
30 Alternative Embodiment, light bulb (FIG. 8)
31 Alternative Embodiment, battery (FIG. 8)
32 Alternative Embodiment, light bulb and battery holder (FIG. 8)
33 Alternative Embodiment, sleeve electrical contact (FIG. 8)
34 Alternative Embodiment of lighted float slide (FIG. 8)
35 Alternative Embodiment, slide electrical contact (FIG. 8)
36 Alternative Embodiment of lighted float sleeve (FIG. 8)

DESCRIPTION—FIGS. 1,2,3,4,5—Preferred Embodiment

Figure 1:
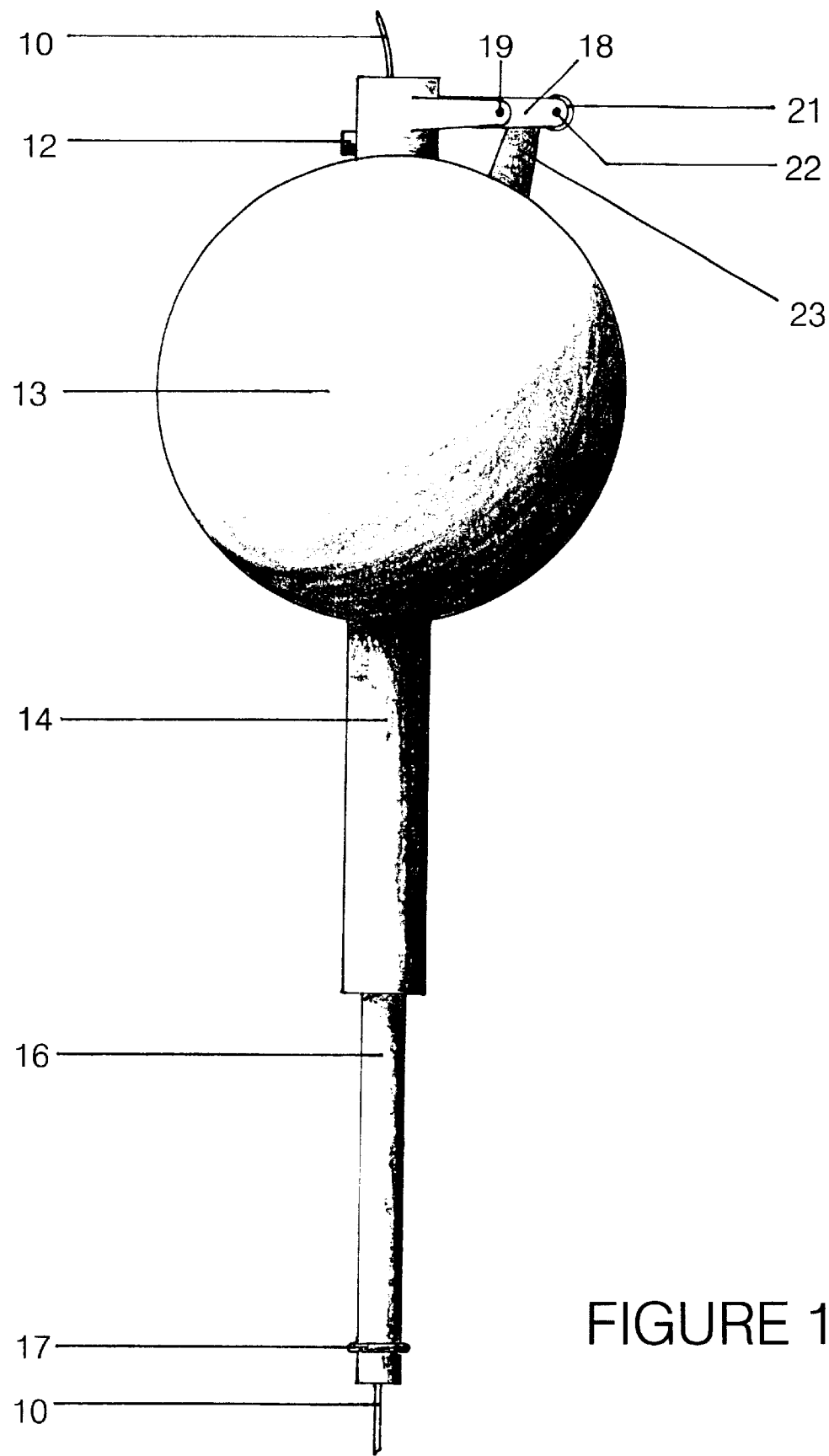
FIG. 1 is a front view of the Slip Bobber with the hook setting device, compressed and locked, in the fishing position.
Figure 2:
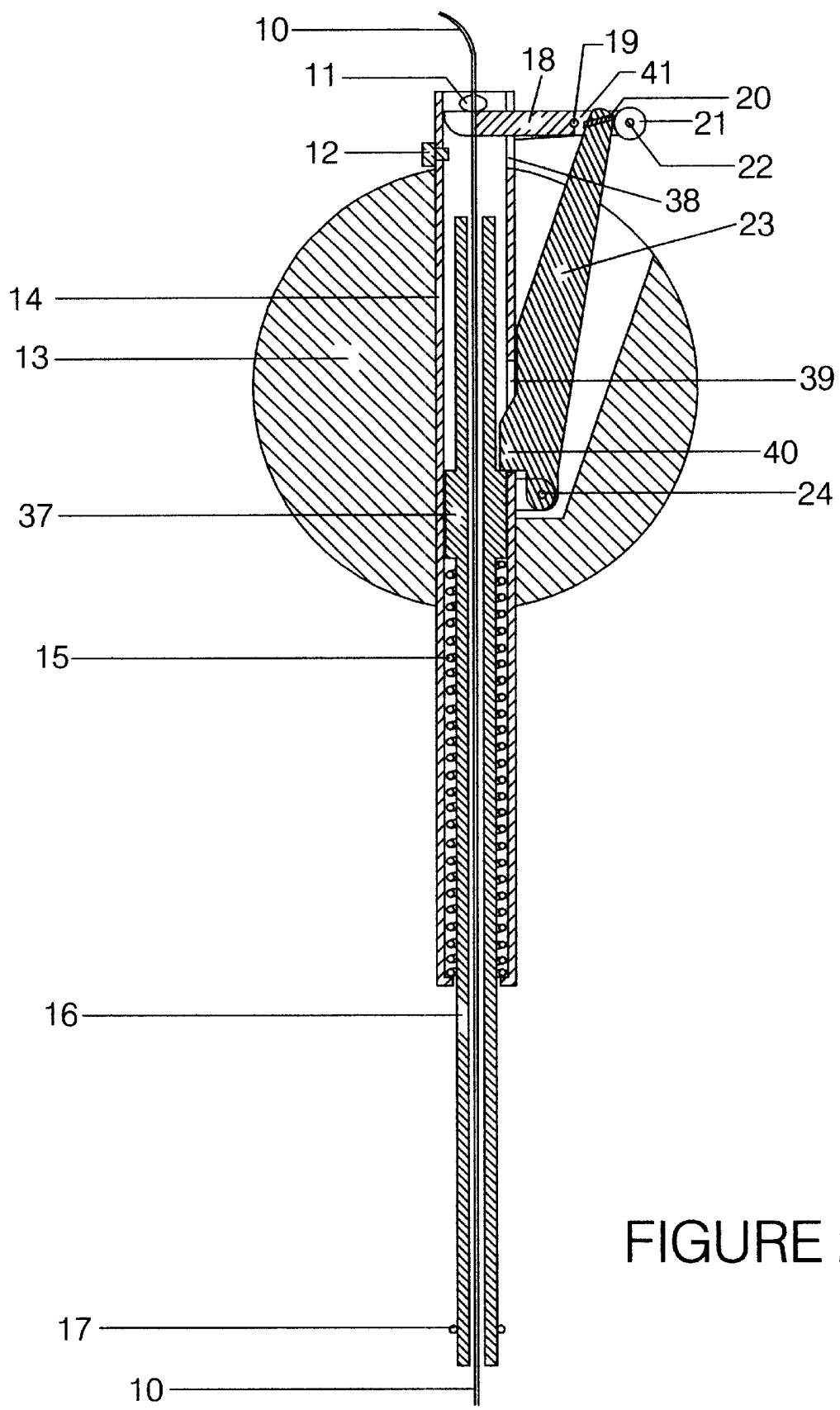
FIG. 2 is a front sectional view of the Slip Bobber with hook setting device compressed and locked in the fishing position.
Figure 3:
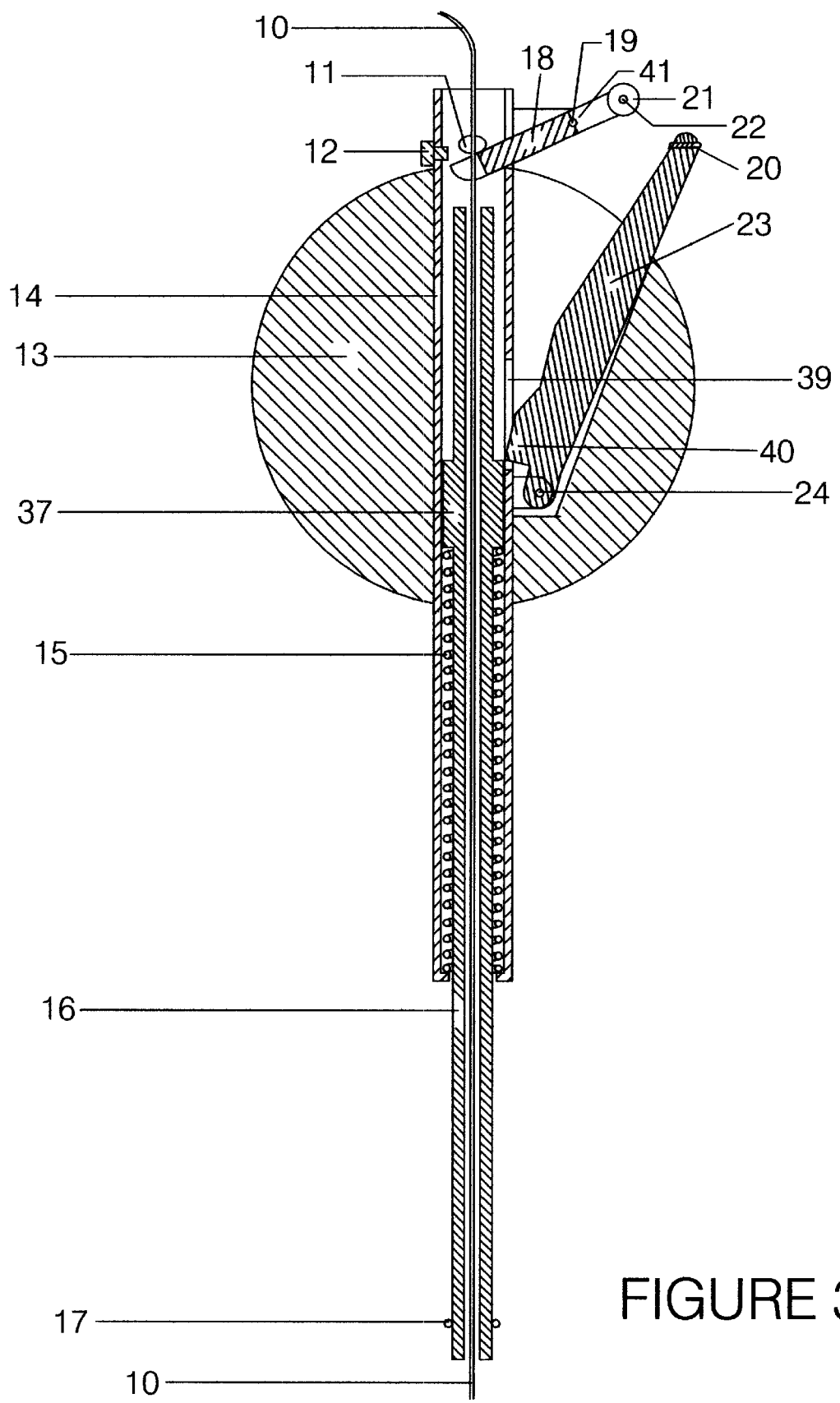
FIG. 3 is a front sectional view of the Slip Bobber with hook setting device after downward pressure on the fishing line has caused the release lever to pivot, unlocking the slide lock lever.
Figure 4:
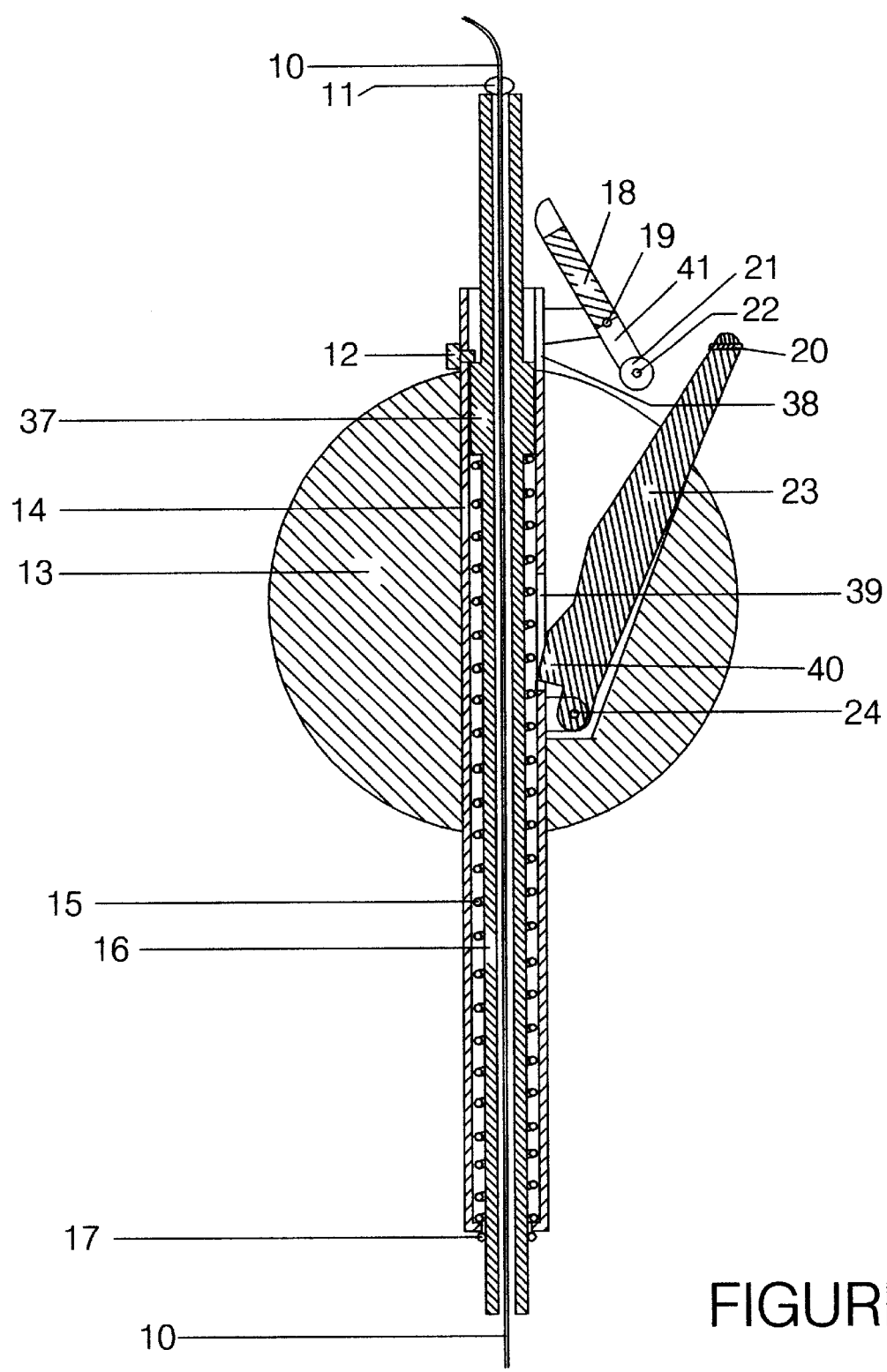
FIG. 4 is a front sectional view of the Slip Bobber with hook setting device in the released position.
Figure 5:
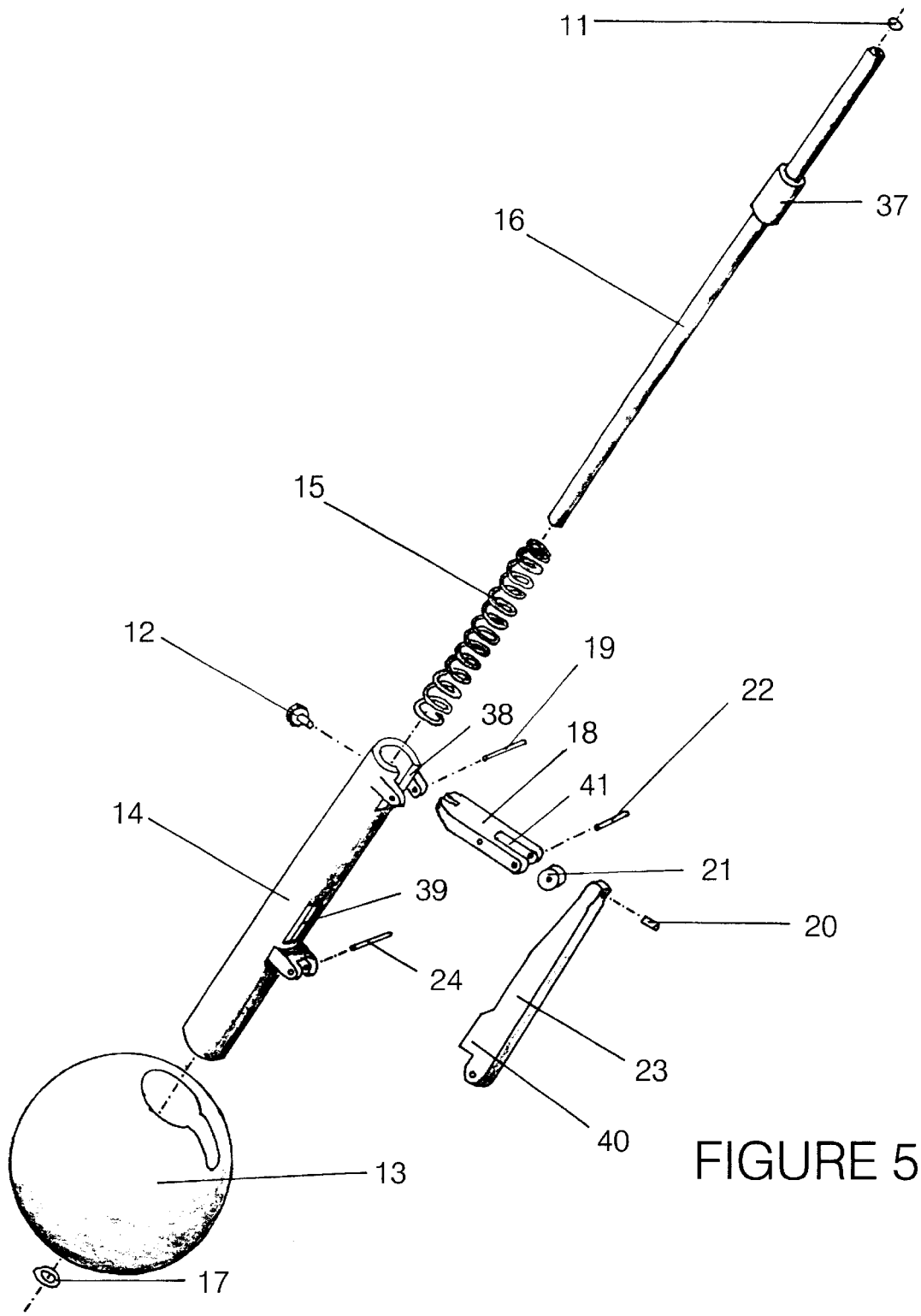
FIG. 5 is a perspective view of the disassembled Slip Bobber with hook setting device.

A preferred embodiment of the present invention is illustrated in FIGS. 1,2, 3, 4 and perspective view FIG. 5. This Slip Bobber with a hook setting device consists of a Float 13 which is made of a buoyant material such as polystyrene or cork. A passage has been made through the float to accommodate the insertion of the hook setting device.

A sleeve 14 is set into the float 13. In the preferred embodiment the sleeve 14 is a tube made of a durable plastic. The sleeve 14 has at one end an open bore, the other end has a slightly restricted opening. The side of the sleeve 14 has two sets of mounting arms to accommodate attachment of the release lever 18 and the slide lock lever 23. Between the mounting arms there are slots 38, 39 in the sleeve 14 to accommodate the passage of the release lever 18 and the slide lock lever 23. A coil spring 15 which has an outside diameter slightly smaller than the inside diameter of the sleeve's 14 open bore. The coil spring 15 must have a compressed height and extended height compatible with the required travel distance of the slide 16. The Coil Spring 15 is slid down inside of the Sleeve 14 until it comes to rest against the slightly restricted bottom end of the Sleeve 14.

The Slide 16 can be manufactured from a durable material such as plastic. It is a shaft with an enlargement 37 approximately in the middle of the length of the shaft. The diameter of the enlargement on the Slide 16 is slightly smaller than the inside diameter of the Sleeve 14. This creates a shoulder on the Slide 16 which the Slide Lock Lever 23 engages on the top edge of the enlargement. The shoulder on the bottom edge of the enlargement engages the Coil Spring 15. The outside diameter of the rest of the slide 16 is slightly smaller than the inside diameter of the coil spring 15 and the inside diameter of the restricted opening on the bottom end of the sleeve 14. The slide 16 has a passage through the center of it longitudinally which allows the unrestricted passage of a fishing line 10. The end of the slide 16 is placed down through the inside bore of the Sleeve 14 and it also passes down through the center of the coil spring 15. The slide 16 will then protrude down through the bottom opening of the sleeve 14. The bottom shoulder of the enlargement on the slide 16 will come to rest on the top of the coil spring 15. The slide lock lever 23 is also manufactured; from a durable material such as plastic. It has a pivot pin hole on the bottom end and a protrusion 40 on one side to be used as a catch to lock the slide 16 and the coil spring 15 into their compressed position. In the preferred embodiment, the top end of the slide lock lever 23 may have a sensitivity adjustment screw 20. When the slide lock lever 23 is attached to the sleeve 14 the pivot pin hole in the slide lock lever 23 will align with the slide lock lever mounting arm holes on the sleeve 14. When the slide lock lever 23 is raised, the catch on the slide lock lever 23, will pass through the opening in the side of the sleeve 14.

The release lever 18 can be manufactured from plastic. On one end, the release lever 18 has a fishing line slot which the fishing line 10 passes through when the hook setting device is in the compressed position. Near the center of the release lever 18, there is a pivot pin hole. On the opposite end of the release lever 18 as the fishing line slot, there is a slide lock lever slot 41 which is wide enough for the slide lock lever 23 to pass through. In the arms created by the slide lock lever slot, there is release lever roller pin holes. This hole runs parallel with the release lever pivot pin hole. The release lever roller 21 is pinned and rolls freely in the release lever 18, slide lock lever slot.

The release lever roller 21 can be manufactured from any durable material such as plastic, wood, or metal. It's purpose is to hold the slide lock lever 23 in the locked position and to reduce the amount of downward force needed on the opposite end of the release lever 18 to rotate the release lever 18.

The slide stop 12 can be manufactured from any durable material such as plastic or metal. It can be threaded into the side of the sleeve 14 in such a, position that it will limit the distance that the slide 16 can travel up the sleeve 14. The slide stop 12 will prevent the slide 16 from traveling out the top of the sleeve 14.

The O-ring 17 is made of rubber and is located on a lower portion of the slide. It is an optional embodiment. The O-ring's 17 potential purpose is to give the Fisherman a gripping surface to use for pulling down the slide 16 into it's compressed position and also to limit the distance that the slide 16 can travel up the sleeve 14.

The sensitivity adjustment screw 20 is an optional embodiment. It can be manufactured from materials such as metal or plastic. It must be a material that can be threaded or molded with threads on it. The sensitivity adjustment screw 20 can be threaded through the slide lock Lever 23 in such a location that the tip of the Sensitivity Adjustment Screw 20 creates a slight bump or restriction to the travel of the release lever roller 21. Screwing the sensitivity adjustment screw 20 in or out will correspondingly create more or less of a restriction to the travel of the release lever roller 21.

The release lever pivot Pin 19, the release lever roller pin 22 and the slide lock lever pin 24 can all be manufactured from any metal that will provide the required rigidity, durability and corrosion resistance.

Figure 6:
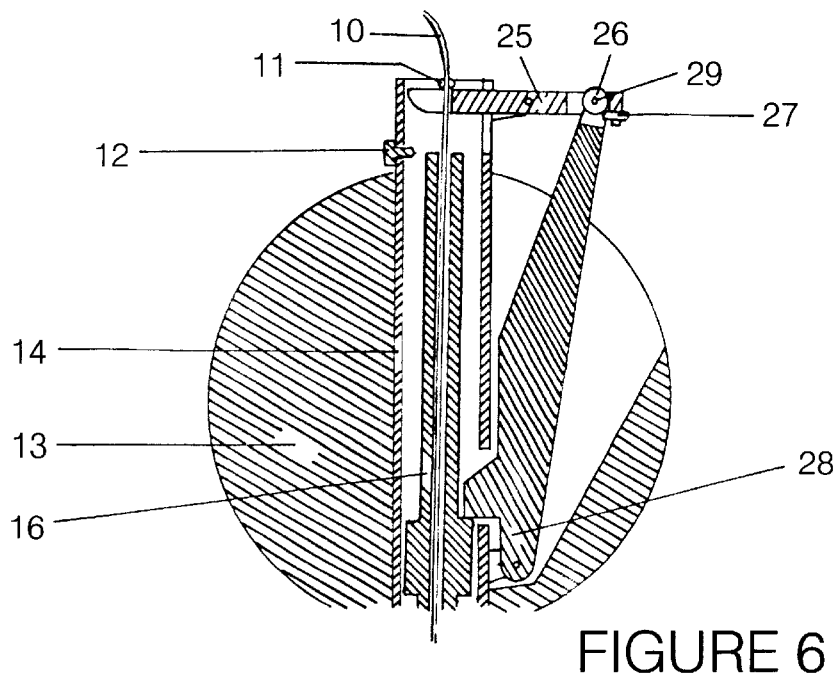
FIG. 6 is a front view of an alternative embodiment for the hook setting device.
Figure 7:
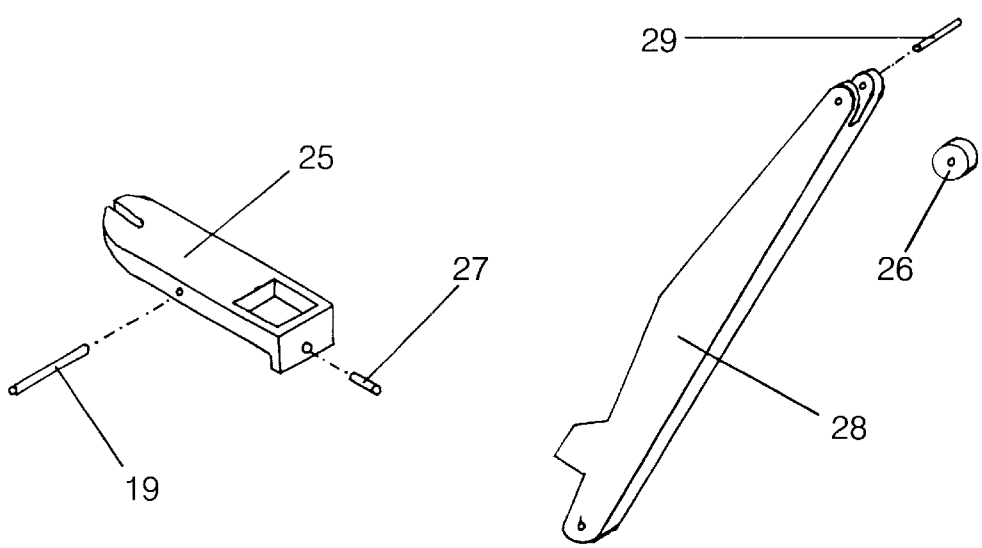
FIG. 7 is a perspective view of the effected parts in an alternative embodiment.

FIGS. 6–7—Alternative Embodiments

There is an alternative embodiment shown in FIGS. 6 and 7. In this embodiment the alternate slide lock lever 28 has the alternate slide lock lever roller 26 mounted on it's upper end. The alternate embodiment of the release lever 25 does not have a roller. The alternate embodiment of the release lever may have a sensitivity adjustment screw 27 as drawn in FIGS. 6 and 7.

FIG. 8—Additional Embodiment

An additional embodiment may include, a small battery 31, a small light bulb 30, and open circuit 42 and metalic electrical contacts 33,35 attached to the Alternative Embodiment lighted float sleeve 36 and the Alternative Embodiment of lighted float slide 34. The metallic electrical contacts 33 and 35 would make contact after the hook setting device is released. This would then close the circuit 42 and illuminate a small light bulb 30 and a Fisherman would be able to see the light.

Advantages

From the description above, a number of advantages of my Slip Bobber with hook setting device become evident:

(a) The triggering mechanism is located on the top of the assembly which will prevent the device from becoming soiled.

(b) The ability of the line to slide freely through the hook setting device permits the bait to be suspended at any depth below the Bobber.

(c) The rotational nature of the slide lock lever mating surface and the release lever roller allows minimal downward force on the fishing line to release the hook setting device.

(d) The sensitivity adjustment screw allows the amount of force required, to release the hook setting device, to be adjusted. This will accommodate the us of larger lures. It can also allow the user to compensate for wave action and casting of the bobber.

(e) The highly sensitive nature of the hook setting device will reduce Fish mortality of most hooked and released fish. The device will set the hook before the Fish can ingest the hook deep enough into it's throat to receive a life threatening wound in their gills or digestive tract. Allowing the Fisherman to release the Fish without serious injury.

(f) This Slip Bobber with hook setting device is very easy to operate.

(g) This design has the possibility of being manufactured in an assortment of sizes.

(h) The top half of the Slide can be manufactured in a bright color. After the hook setting device has been released the top of the slide would protrude up out of the top of the Bobber. This would visually alert the Fisherman.

(i) Electrical contacts, a small battery, and a small light bulb, can be manufactured into the hook setting device so that when the device is released the light bulb would illuminate. This would make this Slip Bobber with hook setting device a very useful night fishing tool.

Operation—FIGS. 1, 2, 3, 4

The manner of using this Slip Bobber with hook setting device is as follows:

(a) A person must first determine how much fishing line they want to hang below the bobber. Then they need to slide their fishing line down through the longitudinal passage in the slide. Pulling the amount of fishing line that they want to hang below the bobber threw the hook setting device. Then they need to place an enlargement on the fishing line at the point that they want the fishing line to stop at the top of the bobber. This enlargement can be produced by simply tying a piece of rubber band or thread around the fishing line. Wrapping the rubber band or thread around the fishing line enough times to create a large enough enlargement. The fishing line can also be passed threw a plastic bead before it is threaded threw the bobber. The bead must have a hole slightly larger than the fishing line. This will allow the enlargement to be kept very small. The smaller the enlargement, the easier that the enlargement will reel threw the eyes of the fishing pole and into the fishing reel.

(b) Now the hook or lure can be tied to the end of the fishing line that hangs below the bobber.

(c) Starting with the hook setting device in the released position. A right handed person could hold the float in their left hand. The top of the hook setting device pointing upward. The first three fingers of their left hand would grip around the bottom of sleeve 14 where the sleeve 14 protrudes out the bottom of float 13. Their fourth and fifth fingers would be below the sleeve 14 where the bottom end of the slide 16 exits the sleeve 14.

(d) The Fisherman would then grip the bottom end of the slide 16 with their right hand. Then while holding the sleeve 14 stationary with their left hand. They would pull down on the slide 16 with their right hand. The slide 16 will move downward, compressing the coil spring 15. When the coil spring 15 is fully compressed the slide 16 will stop. Then the Fisherperson will squeeze the slide 16 with the fourth and fifth fingers of their left hand. This will prevent the slide 16 from being pushed back up into the sleeve 14 by the coil spring 15. Now they can release their grip on the slide 16 with their right hand.

(e) Now with their right hand, they hold the fishing line above the bobber and slide the line into the slotted end of the release lever 18. Next, the slotted end of the release lever 18 is rotated down into the top of the sleeve 14. This causes the roller end of the release lever 18 to rotate up, allowing clearance for the slide lock lever 23 to move into its locked position.

(f) Now, with their right hand they would pivot the top of the slide lock lever 23 toward the top of the sleeve 14. This will cause the catch on the slide lock lever 23 to pass threw the slot in the side of sleeve 14. The catch on the slide lock lever 23 will come to rest on the top of the shoulder created by the larger midsection of the slide 16.

(g) Next, the roller end of the release lever 18 is rotated down. The top end of the slide lock lever 23 will pass through the slot in the release lever 18 inside of the release lever roller 21.

(h) Now, the left hand can release it's grip on the slide 16. The catch on the slide lock lever 23 will hold the slide 16 down against the pressure of the coil spring 15. The release lever roller 21 will hold the slide lock lever 23 into it's locked position.

(i) The release lever 18 will now be in a horizontal position with the fishing line 10 passing through the fishing line slot in the end of the release lever 18. The tip of the release lever 18 with the fishing line slot has very little clearance between it and the inside bore of the sleeve 14. This effectively traps the fishing line 10 in the fishing line slot. This creates a passage in the end of the release lever 18 for the fishing line 10 to slide through. This also provides a surface for the enlargement 11 on the fishing line 10 to come to rest on.

(j) The Slip Bobber with hook setting device is now ready to use. After placing the fishing line 10 and the Slip Bobber into the water. The Slip Bobber with hook setting device will float in an upright position. The weight of the hook or lure will pull the fishing line 10 down through the slot in the release lever 18 and the longitudinal passage in the slide 16. The fishing line 10 will slide down through the bobber until the enlargement 11 comes to rest on the edges of the fishing line slot in the release lever 18.

(k) At this point, the Slip Bobber with hook setting device is ready for a fish to attempt to remove the bait or lure. This is the condition that the Slip Bobber with hook setting device was drawn in FIGS. 1 and 2. When the fish attempts to remove the bait and creates a downward pressure on the fishing line 10. The enlargement 11 on the fishing line 10 will transfer the downward pressure to the slotted end of the release lever 18. The slotted end of the release lever 18 will rotate down due to the downward pressure of the enlargement 11. The roller end of the release lever 18 will then move upward releasing the top end of the slide lock lever 23. This is the position that the assembly was drawn in FIG. 3.

(l) Next, the pressure of the compressed coil spring 15 will push the slide 16 up. The slide 16 will push the catch on the slide lock lever 23 out of the sleeve 14 as the slide 16 moves upward. The top of the slide lock lever 23 will rotate away from the top of the Sleeve 14 as the slide lock lever pivots on the slide lock lever pin 24.

(m) The top of the slide 16 will move upward, coming into contact with the bottom of the slotted end of the release lever 18. The slide 16 will push the slotted end of the release lever 18 upward. As the release lever 18 rotates on the release lever pivot pin 19 the fishing line 10 and the enlargement 11 will slide out and off the end of the release lever 18.

(n) The upward pressure of the coil spring 15 will cause the slide 16 to move up against the enlargement 11 on the fishing line 10. The upward motion of the slide 16 will cause the fishing line 10 to be jerked suddenly upward. This sudden upward jerk on the fishing line 10 will cause the hook on the end of the fishing line 10 to be jerked upward in the fish's mouth, hooking the Fish.

(o) The slide 16 will continue to move upward until the larger midsection of the slide 16 comes to rest against the slide stop 12. This is the position that the Slip Bobber with hook setting device is drawn in FIG. 4. The top end of the slide 16 will then be exposed above the top of the sleeve 14. Being manufactured in a bright color the top of the slide 16 will visually alert the fisherperson.

CONCLUSIONS, RAMIFICATIONS AND SCOPE

Accordingly, the reader will see that the Slip Bobber with hook setting device will be a very useful aid to fishermen. Furthermore the Slip Bobber with hook setting device has additional advantages in that The Slip Bobber with hook setting device is very easy to operate.

The Slip Bobber with hook setting device will reduce Fish mortality, of released fish, due to the sensitive nature of the hook setting device. The device will set the hook before the Fish has an opportunity to ingest the hook deep enough into it's throat to receive a life threatening wound in it's gills or digestive tract.

The ability of the fishing line to slide freely down through the Slip Bobber with hook setting mechanism permits the fisherperson to suspend the bait at any chosen depth.

The rotational nature of the release lever roller surface, and the slide lock lever mating surface, allows minimal downward force on the fishing line to release the hook setting device. Therefore, this the hook setting device can be released by the lightest of biting fish.

The sensitivity adjustment screw allows the fisherperson to adjust the required downward pressure needed to release the hook setting device. This also allows them to adjust for various lure sizes, various lure weights and also for wave action.

This Slip Bobber with hook setting device can also be manufactured in a night fishing version. With the addition of a small battery, a small light bulb, and electrical contacts, the device would light the bulb after being released. This would create a very useful night fishing tool.

Although the description above contains many specifics, these should not be construed as to limit the scope of the invention. Thus the scope of the invention should be determined by the appended claims and their legal equivalents, rather than by the examples given.

I claim:

1. A slip bobber with a hook setting device comprising:
    a buoyant bobber body with a sleeve which extends through the bobber body, the sleeve being defined by a tubular outer wall and having upper and lower ends which protrude from upper and lower portions of the bobber body respectively, the lower end of the sleeve having an end wall extending transversely to the tubular outer wall toward a longitudinal axis of the sleeve and forming a restricted opening at the lower end of the sleeve, and the sleeve having first and second slots through the tubular outer wall, the first slot located near the upper end of the sleeve and the second slot located at a middle portion of the sleeve;
    the hook setting device comprising:
        a coil spring located inside the sleeve;
        a slide having a longitudinal passage to allow free passage of a fishing line and being slidably received within the sleeve, the slide also having an enlargement at an intermediate extent thereof which has a diameter larger than the rest of the slide;
        a locking means for holding said coil spring and said slide in a compressed position which comprises a slide locking lever, a lower portion of the slide locking lever being pivotally attached to the sleeve at a location below the second slot and having a protrusion which is engageable with an upper portion of the enlargement of the slide, and the slide locking lever having one of a roller and a sensitivity adjustment screw on an upper portion thereof;
        a release lever for holding the slide locking lever in a locked position, a middle portion of the release lever being pivotally attached to the sleeve at a location above the first slot, the release lever having a slot for stopping the downward slide of the fishing line when an enlargement on the fishing line comes to rest on top edges of the slot, the slot of the release lever extending from one end of the release lever toward the middle portion, the other end of the release lever having both a slide lock lever slot and the other of the roller and the sensitivity adjustment screw;
    wherein when the hook setting device is set, the coiled spring is compressed between the end wall of the lower end of the sleeve and the enlarged portion of the slide, the slide locking lever is pivoted such that the protrusion extends through the second slot of the sleeve and bears on the upper portion of the enlargement and the upper portion of the slide locking lever extends into the slide lock lever slot and the other of the roller and the sensitivity adjustment screw is engageable with the one of the roller and the sensitivity adjustment screw of the release lever, and when the fishing line is attached to the bobber, the line passes through both the slot of the release lever and the slide and the enlargement on the fishing line rests upon the top edges of the slot of the release lever; and
    wherein when the fishing line is pulled downwardly, the enlargement on the line acts upon the release lever and causes the other end of the release lever to move away from the slide locking lever and hence causes both the other of the roller and the sensitivity adjustment screw to disengage from the one of the roller and the sensitivity adjustment screw of the slide locking lever and the upper portion of the slide locking lever to leave the slide lock lever slot which thereby releases the slide locking lever, allowing the slide locking lever to pivot away from the sleeve and the protrusion to disengage from the enlargement on the slide which allows the spring to urge the slide upward and move the line upwardly therewith when the slide engages the enlargement on the fishing line and whereby the hook setting device is released.

2. The slip bobber of claim 1, further comprising:
    a slide stop which extends through the outer wall of the sleeve and is engageable with the enlargement of the slide;
    an O-ring located on a lower portion of the slide; and
    wherein either the slide stop or the O-ring are capable of limiting the distance that the slide travels up the sleeve when the hook setting device is released.

3. The slip bobber of claim 1, further comprising:
    an electrical power source;
    a light bulb;
    an open circuit connecting the power source to the light bulb;
    a pair of electrical contacts for closing the circuit, one of the pair of contacts being on the enlargement on the slide and the other of the pair of contacts extending through an upper portion of the sleeve;
    wherein when the hook setting device is released, the pair of contacts come into engagement and close the circuit to thereby connect the power source to the light bulb and thus energize the light bulb so as to provide an indication to a user.

* * * * *